US011885882B1

(12) United States Patent
Kalm

(10) Patent No.: US 11,885,882 B1
(45) Date of Patent: Jan. 30, 2024

(54) TRIANGULATION SENSOR SYSTEM

(71) Applicant: Amazon Technologies, Inc., Seattle, WA (US)

(72) Inventor: William Scott Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 676 days.

(21) Appl. No.: 17/104,944

(22) Filed: Nov. 25, 2020

(51) Int. Cl.
*B25J 9/16* (2006.01)
*G01S 17/48* (2006.01)
*G01B 11/02* (2006.01)
*G06Q 10/087* (2023.01)

(52) U.S. Cl.
CPC ............. *G01S 17/48* (2013.01); *B25J 9/1679* (2013.01); *B25J 9/1697* (2013.01); *G01B 11/026* (2013.01); *G05B 2219/31028* (2013.01); *G05B 2219/31081* (2013.01); *G06Q 10/087* (2013.01)

(58) Field of Classification Search
CPC .................. G01S 17/48; G01B 11/026; G05B 2219/31028; G05B 2219/31081; G06Q 10/087; B25J 9/1679; B25J 9/1697; B25J 15/0014; B25J 9/0087; B25J 9/0096; B25J 13/08; B25J 15/0019; B25J 9/0093; B65G 1/1373; B65G 1/0435; B65G 1/1375; B65G 1/10
See application file for complete search history.

(56) References Cited

U.S. PATENT DOCUMENTS

| | | | |
|---|---|---|---|
| 10,207,868 B1 * | 2/2019 | Stubbs ................ | G06Q 10/087 |
| 10,272,566 B2 * | 4/2019 | Wellman .............. | G06Q 10/087 |
| 10,315,231 B1 * | 6/2019 | Brazeau ................... | B07C 5/38 |
| 10,395,152 B2 * | 8/2019 | Durham ............. | G06K 17/0025 |
| 10,471,597 B1 * | 11/2019 | Murphy ................ | B25J 9/1674 |
| 10,503,143 B1 * | 12/2019 | Polic .................... | G05B 19/406 |
| 10,504,056 B1 * | 12/2019 | Stubbs ................ | G06Q 10/087 |
| 10,628,790 B1 * | 4/2020 | Aggarwal ............ | G06Q 10/087 |
| 10,656,649 B1 * | 5/2020 | Garrett ............... | G06K 7/10366 |
| 10,669,069 B2 * | 6/2020 | Tubilla Kuri .......... | B25J 9/1679 |
| 11,130,242 B1 * | 9/2021 | Kalm ................... | B25J 15/0033 |
| 11,331,796 B2 * | 5/2022 | Duffy .................. | B25J 15/0066 |
| 11,661,274 B1 * | 5/2023 | Patel ................... | B25J 15/0014 |
| | | | 414/278 |

OTHER PUBLICATIONS

Kwon et al., Robust Autonomous Navigation of Unmanned Aerial Vehicles (UAVs) for Warehouses Inventory Application, 2019, IEEE, p. 243-249 (Year: 2019).*
Beul et al., Fast Autonomous Flight in Warehouses for Inventory Applications, 2018, IEEE, p. 3121-3128 (Year: 2018).*
Harik et al., Towards an Autonomous Warehouse Inventory Scheme, 2016, IEEE, p. 1-8 (Year: 2016).*

(Continued)

*Primary Examiner* — Mcdieunel Marc
(74) *Attorney, Agent, or Firm* — Kilpatrick Townsend & Stockton LLP

(57) ABSTRACT

An inventory management system includes an inventory holder and sensors. The sensors measure distances to locations on the inventory holder. The measurements are used to determine pitch, roll, and yaw of the inventory holder. The pitch, roll, and yaw are used to determine a location of an inventory cubicle in the inventory holder.

20 Claims, 9 Drawing Sheets

(56) References Cited

OTHER PUBLICATIONS

Cidal et al., A Study on the Development of Semi Automated Warehouse Stock Counting System, 2019, IEEE, pg. (Year: 2019).*
"Container Transporter," U.S. Appl. No. 16/751,084, filed Jan. 23, 2020, 37 pages.
"Flexible Container Pods for Use With Robotic Systems," U.S. Appl. No. 16/984,754, filed Aug. 4, 2020, 49 pages.
"Container Transporters," U.S. Appl. No. 17/098,604, filed Nov. 16, 2020, 50 pages.

* cited by examiner

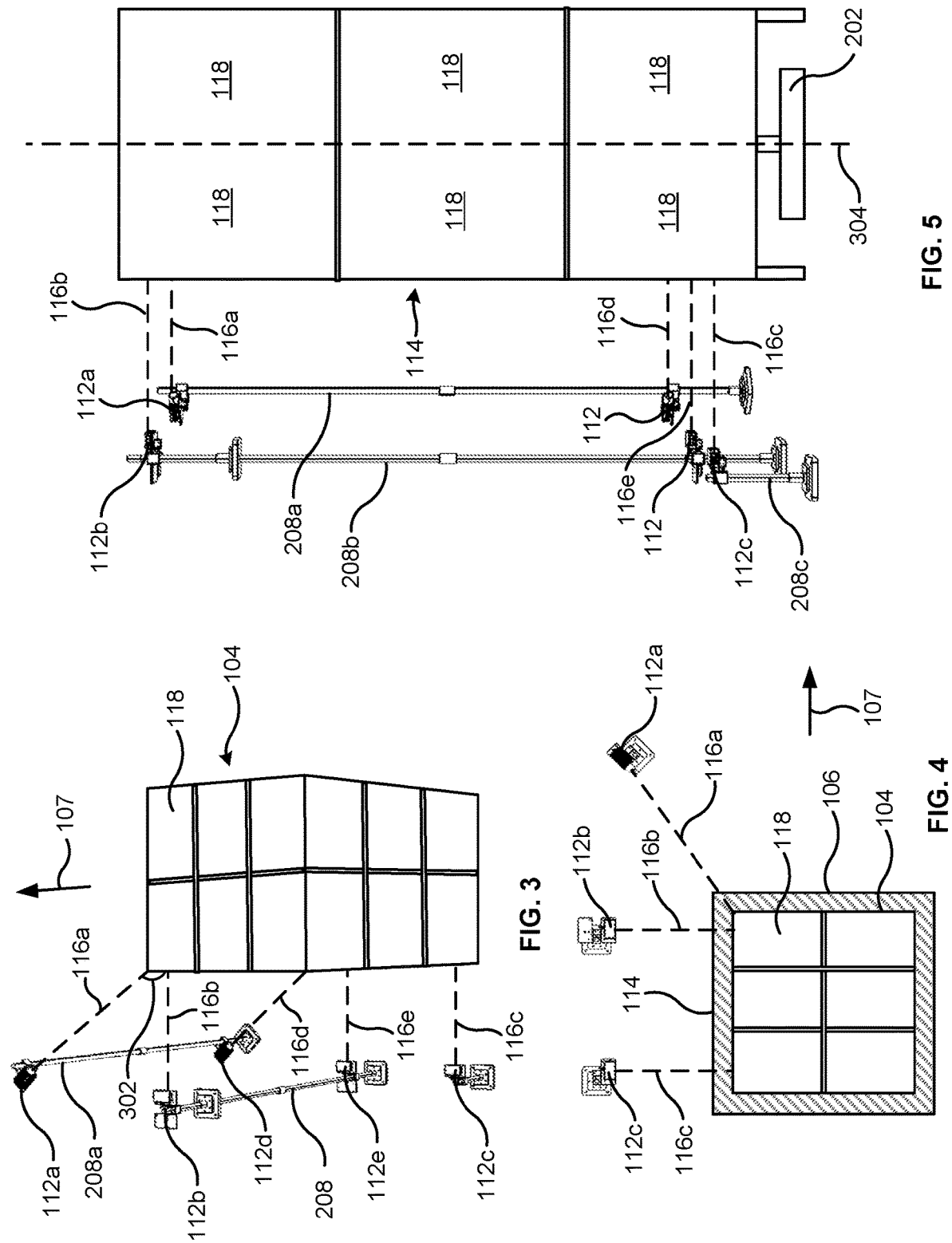

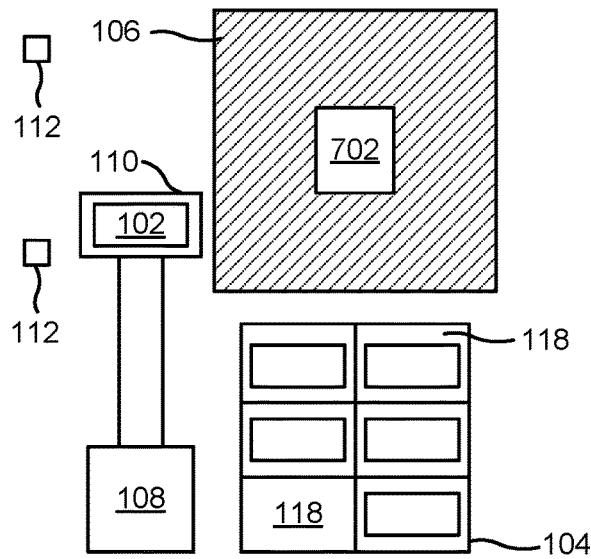
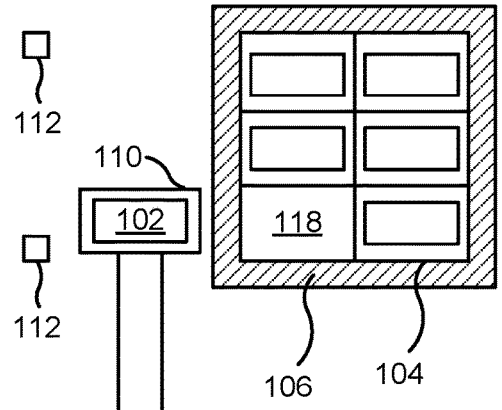
FIG. 11　　　　　　　　FIG. 12
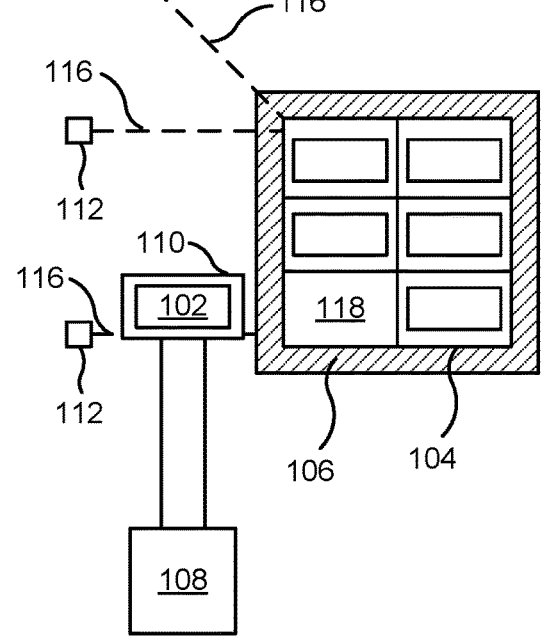
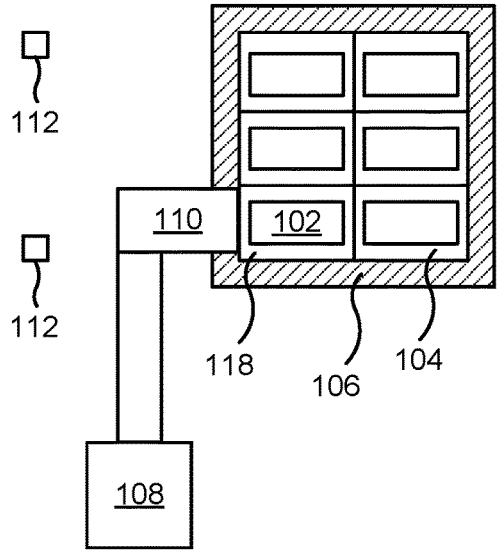
FIG. 13　　　　　　　　FIG. 14

TRIANGULATION SENSOR SYSTEM

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space and equipment can result in lower throughput, unacceptably long response times, an ever-increasing backlog of unfinished tasks, and, in general, poor system performance. Additionally, once an inventory storage location has been filled to capacity with items and equipment, the cost of adding additional space or moving the items and equipment to a secondary location may be prohibitively expensive, limiting the ability of the location to accommodate additional items.

BRIEF DESCRIPTION OF THE DRAWINGS

Various embodiments in accordance with the present disclosure will be described with reference to the drawings, in which:

FIGS. 3-5 illustrate various views of example sensors that can be included in particular embodiments of the inventory management system of FIG. 1;

FIGS. 7-14 illustrate various states of components that may be implemented in a simplified example process for receiving, moving, and depositing inventory that can be used with particular embodiments of the inventory management system of FIG. 1;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, systems and techniques relating to an inventory management system for moving and managing inventory. Various techniques described herein may include automation of the systems and techniques. The techniques described herein may be implemented by any suitable inventory management system, but particular examples are described that include sensor systems. The sensor system can include sensors that detects a position of an inventory holder. The sensors can detect, for example, the pitch, roll, and/or yaw of the inventory holder. The pitch, roll, and/or yaw of the inventory holder can be used to determine a location on a side of the inventory holder. An inventory manipulator can engage with and move inventory containers onto or off of the inventory holder, for example, at the location determined using the pitch, roll, and/or yaw.

Turning now to a particular example, in this example, an inventory management system includes sensors that can detect a position of an inventory holder. An inventory manipulator can position an end-of-arm tool near an engagement position, for example, in a warehouse environment. The inventory holder can be moved to the engagement position to receive or deposit inventory containers into inventory compartments. The sensors can detect the pitch, roll, and yaw of the inventory holder at the engagement position. The pitch, roll, and yaw of the inventory holder can be used to determine a location of one or more of the inventory compartments on one side of the inventory holder. The robotic manipulator can align the end-of-arm tool with one of the inventory compartments and the end-of-arm tool can engage with inventory containers to move the inventory containers into or out of the compartment. The robotic manipulator can align the end-of-arm tool with another inventory compartment or the inventory holder can be away from the engagement area, for example, to another area of the warehouse environment.

Figure 1:
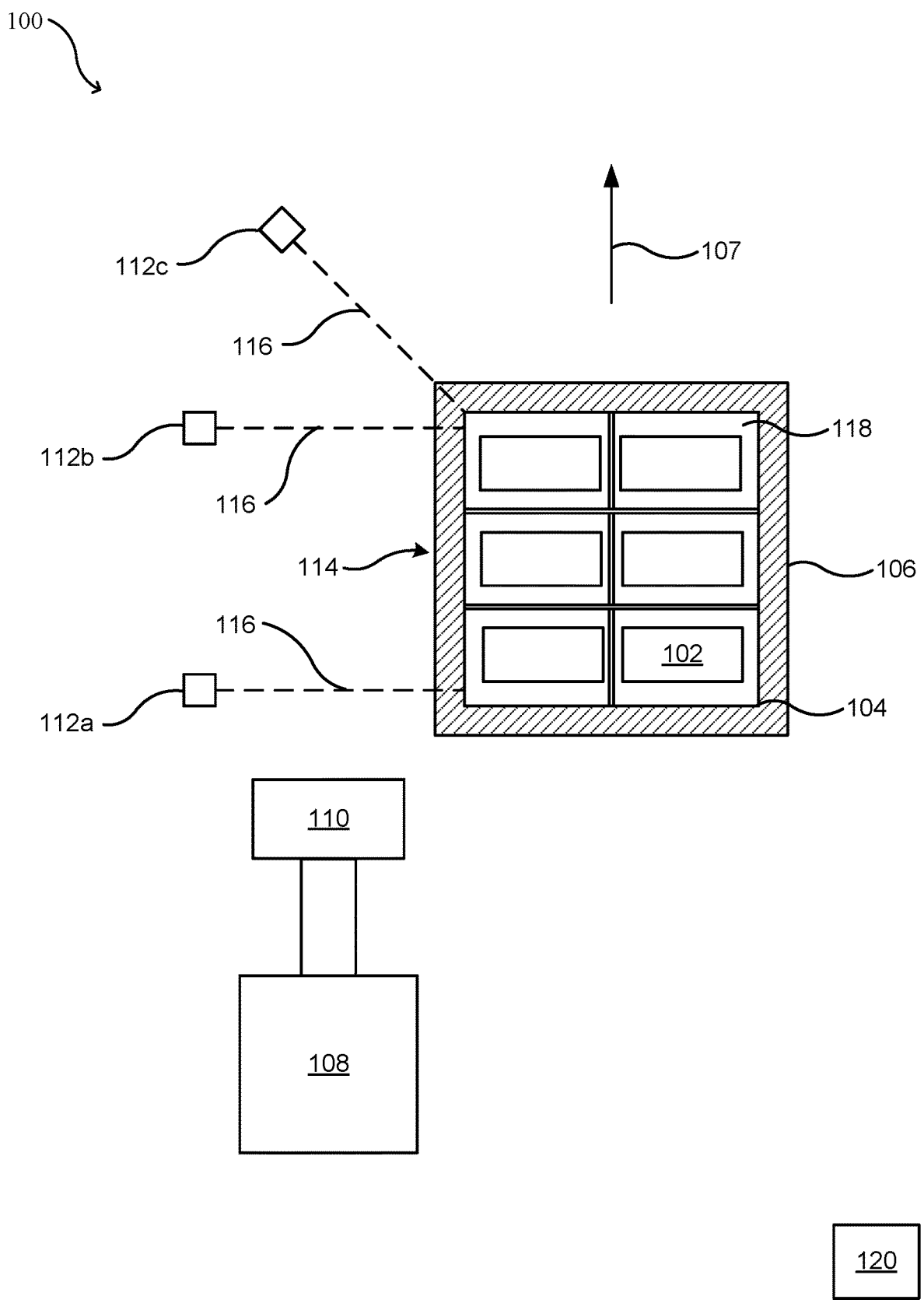
FIG. 1 shows a top view of a simplified inventory management system, in accordance with embodiments, for moving and managing inventory.

Turning now to the figures, FIG. 1 shows a top view of a simplified inventory management system 100 for moving and managing inventory containers 102. As described herein, inventory containers 102 can be positioned in an inventory holder 104. The inventory holder 104 can move the inventory containers 102, for example, around a warehouse environment. The inventory holder 104 can move the inventory containers 102 to a position for loading the inventory containers 102 onto or off of the inventory holder 104. For example, the inventory holder 104 can move the inventory containers 102 to an engagement area 106 (e.g., in direction 107). A robotic manipulator 108 can position an end-of-arm tool 110 to a position for engagement with the inventory containers 102. For example, the end-of-arm tool 110 can be positioned at or near the engagement area 106.

One or more sensors 112 can be positioned, for example, in the warehouse environment and oriented to detect one or more aspects of the inventory holder 104, for example, in the engagement area 106. The sensors 112 can measure distances to various locations on the inventory holder 104. For example, sensor 112a and sensor 112b can measure distances to locations on an engagement side 114 of the inventory holder 104 and sensor 112c can measure a distance to a corner of the inventory holder 104. However, any suitable number of sensors 112 can be used to detect distances to various locations on the inventory holder 104.

The distances 116 can be used to determine the pitch, the roll, and/or the yaw (e.g., the attitude) of the inventory holder 104. The pitch, the roll, and/or the yaw can be used to determine the location of one or more inventory compartments 118 (e.g., cubicles) in the inventory holder 104. For example, the pitch, the roll, and/or the yaw can be used to determine a location of an inventory compartment 118 on the engagement side 114 of the inventory holder 104. In various embodiments, the location of the inventory compartments 118 can be determined by generating a grid system (e.g., a Cartesian coordinate system, a polar coordinate system, and/or other suitable coordinate systems) that maps the locations of the inventory compartments 118 onto the first side of the inventory holder 104. The coordinate system can be generated using the yaw, pitch, and roll of the inventory holder 104 and known mathematical equations. The coordinate system can be used to determine a location of one or more of the openings 118. For example, using the yaw, pitch, and roll of the inventory holder 104 can be used to generate a coordinate system that identifies the position of some or all of the compartments 118. The positions of the compartments 118 can be used to move the end-of-arm tool 110 to desired compartments. The coordinate system can align with the openings of the compartments 118 (e.g., the coordinates can identify the sides, top, bottom, and/or the center of the compartments 118).

In various embodiments, the movement of the end-of-arm tool 110 can move relative to a position of a compartment 118 and/or a staging location (e.g., a perched location). For example, the end-of-arm tool 110 can move from an opening of one compartment 118 to an opening of another compartment 118 based on the location of the second compartment 118 relative to the first compartment 118. The end-of-arm tool 110 can also be moved relative to the staging position of the end-of-arm tool 110 (e.g., the end-of-arm tool 110 can be moved to a compartment 118 based on the position of the compartment 118 relative to the staging position).

The robotic manipulator 108 can position the end-of-arm tool 110 at the locations of the inventory compartments 118. For example, the end-of-arm tool 110 can be aligned with the inventory compartment 118. The end-of-arm tool 110 can engage with inventory containers 102, for example, to move the inventory containers 102 into or out of the inventory compartment 118. In various embodiments, the robotic manipulator 108 can move the end-of-arm tool 110 to another inventory compartment 118 in the inventory holder 104 and/or to another location in the warehouse environment. Additionally or alternatively, the inventory holder 104 can move away from the engagement area 106, for example, in direction 107.

In various embodiments, a computing device 120 can control one or more components of the inventory management system 100. For example, the computing device 120 can receive the distance measurements from the sensors 112. The computing device 120 is shown as a single device positioned in the warehouse environment, however, the computing device 120 can include multiple devices positioned in multiple locations. For example, the computing device 120 can include multiple devices with some or none of the devices positioned in the warehouse environment. The computing device 120 is described herein in additional detail, for example, in reference to FIG. 18.

Figure 2:
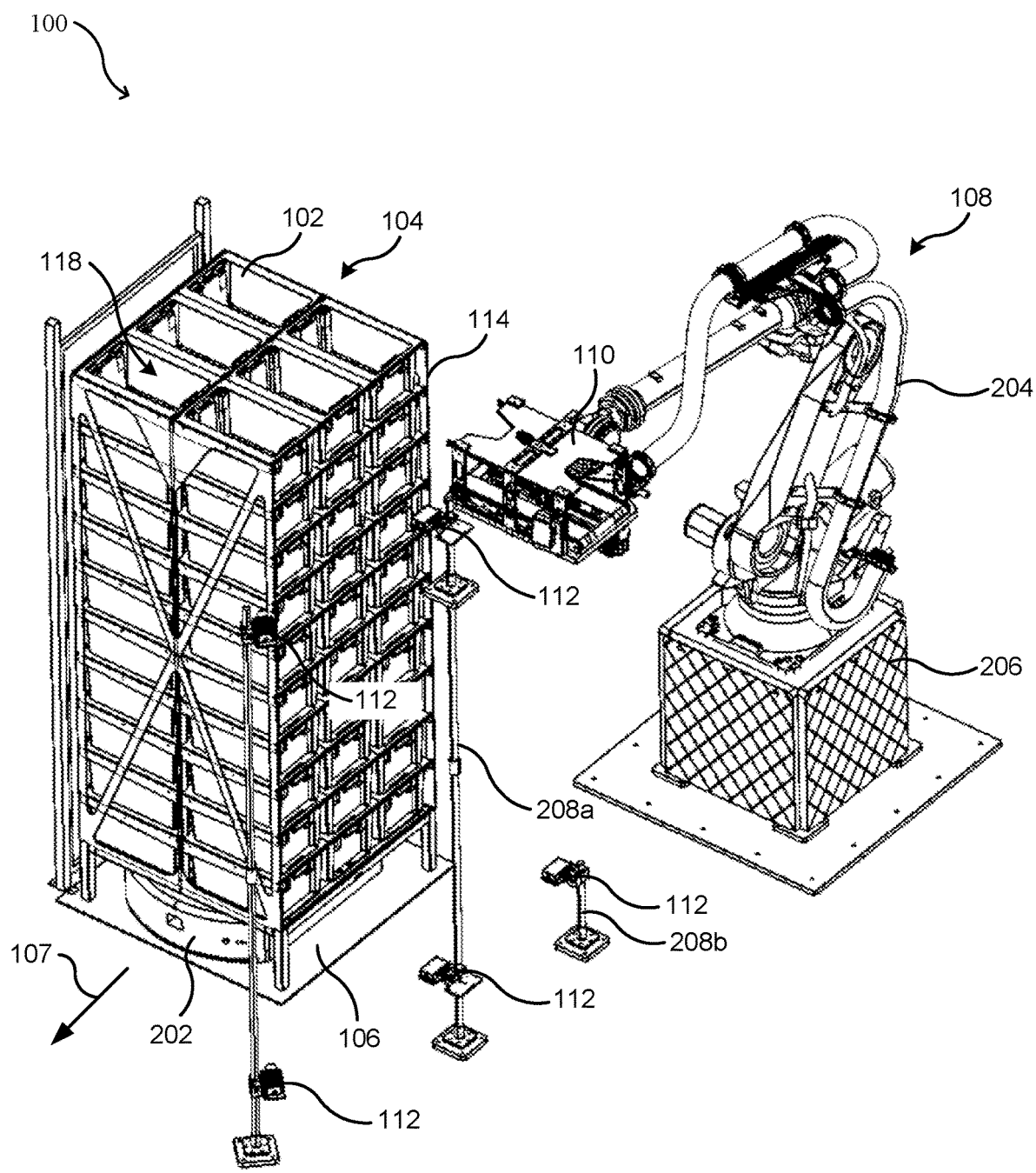
FIG. 2 illustrates in greater detail an example of the inventory management system of FIG. 1, in accordance with embodiments.

FIG. 2 illustrates in greater detail an example of the inventory management system 100 of FIG. 1. Inventory containers 102 can be positioned in the inventory compartments 118 of the inventory holder 104. The inventory containers 102 can be or include a container or a bin with an interior area for containing one or more items. The inventory containers 102 may include rigid or semi-rigid material, for example, plastic, cardboard, paper, or any suitable material for containing items. In some embodiments, the inventory containers 102 can include handles, hooks, engagement surfaces, suctionable surfaces, or other features and/or components for engaging with the inventory holder 104. In further embodiments, the inventory containers 102 may be or include inventory (e.g., items). For example, items can be moved by the inventory holder 104 without first being positioned in an inventory container 102.

Multiple inventory containers 102 can be positioned in the inventory holder 104. The inventory holder 104 can include one or more faces for receiving inventory containers 102. Examples of such inventory holders 104 are disclosed in U.S. application Ser. No. 16/984,754, filed on Aug. 4, 2020 and titled "FLEXIBLE CONTAINER PODS FOR USE WITH ROBOTIC SYSTEMS," the entire disclosures of which is herein incorporated by reference. For example, the inventory holder 104 can include an engagement side 114 that can be oriented for interaction with the end-of-arm tool 110. The faces can include inventory compartments 118 (e.g., shelves, walls, compartments, and/or rails) for receiving the inventory containers 102. For example, the faces can be positioned in the inventory holder 104 to arrange the inventory containers 102 into vertical columns and/or horizontal rows. The inventory holder 104 is described herein in additional detail, for example, in reference to FIG. 17.

The inventory holder 104 can be moved by a mobile drive unit 202 around the warehouse environment. For example, the inventory holder 104 can be moved in direction 107 towards and/or away from the engagement area 106. In some embodiments, the inventory holder 104 may additionally or alternatively include or be accompanied by a propulsion system or other system to move the inventory holder 104. The mobile drive unit 202 can include a propulsion system and engagement components for engaging with the inventory holder 104. The engagement components can engage with the inventory holder 104 for movement of the inventory holder 104, for example, by lifting the inventory holder 104. The mobile drive unit 202 can be manually controlled to move the inventory holder 104 and/or can include components for automated movement. For example, the mobile drive unit 202 can include components to automatically move toward and engage with the inventory holder 104 and move the inventory holder 104 into a suitable position (e.g., into the engagement area 106) for interaction with the end-of-arm tool 110. The mobile drive unit 202 is described herein in additional detail, for example, in reference to FIGS. 15 and 16.

The mobile drive unit 202 can position the inventory holder 104 in the engagement area 106. The engagement area 106 can be a designated area, for example, in a warehouse environment. The engagement area 106 can include markings (e.g., a visual designation) that differentiates the engagement area 106 from the warehouse environment. However, the engagement area 106 can be an area in the warehouse environment that is visually similar to or the same as the warehouse environment (e.g., the engagement area 106 can be free or substantially free of a visual designation). The engagement area 106 can additionally or alternatively be designated via a digital designation. For example, the engagement area 106 can include a digital border (e.g., a gps border) that differentiates the engagement area 106 from the warehouse environment.

In various embodiments, the engagement area 106 can include a fiducial mark, for example, to aid in positioning of the inventory holder 104. For example, the fiducial can be positioned in the engagement area 106 at a location where stopping the inventory holder 104 will generally align an inventory compartment 118 with the end-of-arm tool 110. The fiducial mark can additionally or alternatively include data associated with movement of the inventory holder 104. For example, the fiducial mark can include a direction of travel for the inventory holder 104.

The robotic manipulator 108 can position the end-of-arm tool 110 near the inventory holder 104 positioned in the engagement area 106. The end-of-arm tool 110 can be positioned for moving, removing, and/or depositing inventory containers 102 into and/or out of the inventory holder 104. Examples of such end-of-arm tools 110 are disclosed in U.S. application Ser. No. 16/751,084, filed on Jan. 23, 2020 and titled "CONTAINER TRANSPORTER," and U.S. application Ser. No. 17/098,604, filed on Nov. 16, 2020 and titled "CONTAINER TRANSPORTERS," the entire disclosures of both of which are herein incorporated by reference in their entireties for all purposes. In various embodiments, the robotic manipulator 108 can position the end-of-arm tool 110 near the engagement area 106 prior to the inventory holder 104 being positioned in the engagement area 106. For example, the robotic manipulator 108 can position the end-of-arm tool 110 at a position that will generally align with an inventory compartment 118 when the inventory holder 104 is positioned in the engagement area 106. The general alignment between the end-of-arm tool 110 and the inventory compartment 118 can allow the end-of-arm tool 110 to move an inventory container 102 into and/or out of the inventory compartment 118, however, there may be additional alignment between the end-of-arm tool 110 and the inventory compartment 118. The robotic manipulator 108 can position the end-of-arm tool 110 at the general alignment position prior to the inventory holder 104 reaching the engagement area 106, after the inventory holder 104 has reached the engagement area 106, and/or simultaneously with the inventory holder 104 reaching the engagement area 106.

The robotic manipulator 108 can be or include a robotic arm 204 positioned on a base 206. The robotic arm 204 can be moveable along multiple axes. For example, the robotic arm 204 can be moveable along six-axes, although any other suitable number greater than or less than six could alternatively be utilized. The robotic manipulator 108 can include one or more attachment points and/or engagement components for attaching to various components.

The base 206 can be mounted at a stationary position in the warehouse environment. For example, at a location near the engagement area 106. However, the base 206 can attach to and/or include a propulsion system that can allow the robotic manipulator 108 to move around the warehouse environment. For example, the base 206 can move the robotic manipulator 108 around the inventory holder 104 and the end-of-arm tool 110 can engage with inventory compartment 118 on different sides of the inventory holder 104.

The sensors 112 can be positioned and oriented to measure a distance to the inventory holder 104 in the engagement area 106. For example, the sensors 112 can be mounted to one or more support structures 208 positioned in the warehouse environment. The support structures 208 can be various sizes and can accommodate one or more sensors 112 at various positions. For example, support structure 208a can include two sensors 112 and support structure 208b can include one sensor 112. The support structures 208 can be sized to position the sensors 112 to measure distances to various locations on the inventory holder 104. For example, the support structure 208 can position sensors 112 to measure distances to locations at or near the top of the inventory holder 104 and/or the support structure 208 can position sensors 112 to measure distances to locations at or near the bottom of the inventory holder 104. In various embodiments, the sensors 112 can additionally or alternatively be mounted to various locations in the warehouse environment. For example, the sensors 112 can be mounted at and/or near the roof of the warehouse FIGS. 3-5 illustrate various views of example sensors 112 that can be included in particular embodiments of the inventory management system 100 of FIG. 1. FIG. 3 is an isometric view of the sensors 112 and inventory holder 104, FIG. 4 is a top view of the sensors 112 and the inventory holder 104, and FIG. 5 is a side view of the sensors 112 and the inventory holder 104. The inventory holder 104 is shown without inventory containers 102, however, inventory containers 102 can be positioned in some or all of the inventory compartment 118. FIGS. 3-5 show an arrangement of the sensors 112 that can measure distances 116 to locations on the inventory holder 104, however, any suitable arrangement of sensors 112 can be used. The sensors 112 can be or include time-of-flight sensor, a light detection and tanging (lidar) sensor, interferometers, proximity sensors, and/or any suitable sensor for measuring distance.

Sensors 112a and 112d can be used to measure distances 116 to a corner of the inventory holder 104 (e.g., a leading corner of the engagement side 114). The sensors 112a and 112d can be positioned at an angle 302 relative to the engagement side 114 of the inventory holder 104. For example, the sensors 112a and 112d can be positioned at an angle 302 in a range between 15 degrees and 100 degrees relative to the engagement side 114. In some embodiments, the sensors 112a and 112d can be positioned at approximately 45 degrees relative to the engagement side 114. The sensors 112a and 112d can positioned on the same support structure 208a, for example, at different heights. In various embodiments, sensor 112a can be positioned to measure the distance 116a to a location at or near the top of the inventory holder 104 and sensor 112b can be positioned to measure the distance 116d to a location at or near the bottom of the inventory holder 104. The measurements from sensors 112a and 112d can be used to determine the pitch of the inventory holder 104. For example, the difference between distances 116a and 116d can be used to determine the pitch of the inventory holder 104 (e.g., whether the inventory holder 104 is leaning forward or backwards relative to the direction 107).

Sensors 112b and 112e can be used to measure distances to the engagement side 114 of the inventory holder 104. The sensors 112b and 112e can be positioned on support structure 208b (e.g., with sensor 112b positioned above sensor 112e). Sensor 112b can be positioned to measure a distance 116b to a location at or near the top of the inventory holder 104 (e.g., at or near the height of the location measured by sensor 112a) and sensor 112e can be positioned to measure a distance 116e to a location at or near the bottom of the inventory holder 104 (e.g., at or near the height of the location measured by sensor 112d). The measurements from sensors 112b and 112e can be used to determine the roll of the inventory holder 104. For example, the difference between distances 116b and 116e can be used to determine the roll of the inventory holder 104 (e.g., whether the inventory holder 104 is leaning towards or away from sensors 112b and 112e).

Sensor 112c can be positioned on a support structure 208c. The support structure 208c can be smaller (e.g., shorter) than the support structures 208a and/or 208b. Sensor 112c can be positioned to measure a distance 116c to a location at or near the bottom of the inventory holder (e.g., at or near the height of the location measured by sensor 112e). The measurements from sensors 112c and 112e can be used to determine the yaw of the inventory holder 104. For example, the difference between distances 116c and 116e can be used to determine the yaw of the inventory holder 104 (e.g., whether the inventory holder 104 rotated about central axis 304).

The sensors 112 can be connected to computing device 120. For example, the sensors 112 can send the distances 116 to computing device 120. The computing device 120 can use the distances 116 to determine the pitch, roll, and/or the yaw of the inventory holder 104. The computing device 120 can use the pitch, roll, and/or the yaw of the inventory holder 104 to determine the location of an inventory compartment 118 in the inventory holder 104.

Figure 6:
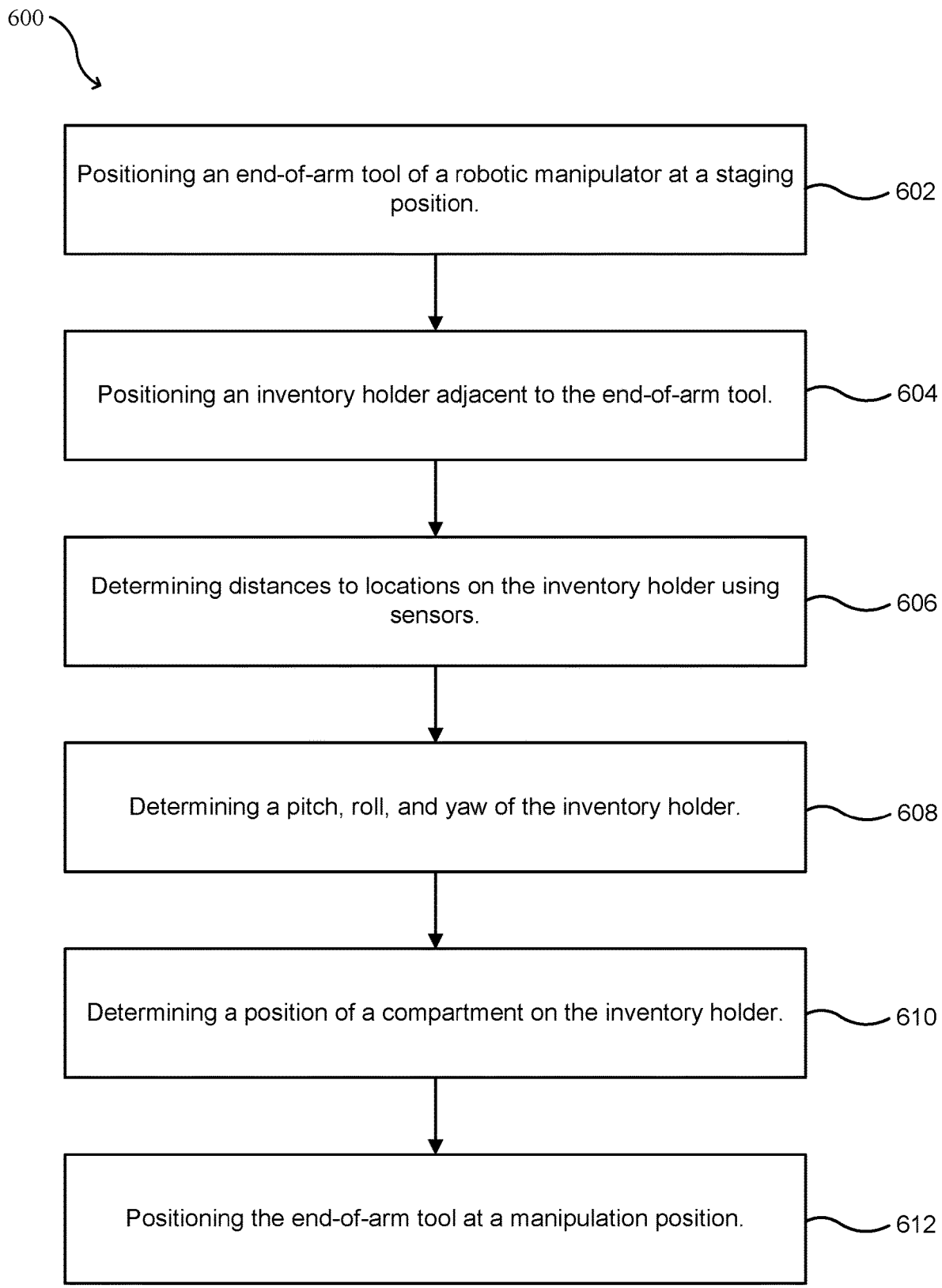
FIG. 6 is a flowchart illustrating a process for moving inventory containers using the inventory management system of FIG. 1.

Turning to FIG. 6, a flowchart illustrating a process 600 for moving inventory containers 102 using the inventory management system 100 of FIG. 1 is shown. Various blocks of the process 600 are described by referencing the components shown in FIGS. 7 through 14, however, additional and/or alternative components may be used with the process 600. Moreover, although the process 600 is described below in terms that may be relevant to inventory container insertion scenarios as well as extraction scenarios, relevant portion of the process 600 and associated components may be utilized for handling insertion scenarios alone, extraction scenarios alone, or a combination of insertion and extraction scenarios. Further, the blocks of the process 600 are described in a certain order, however, the process 600 can be performed with the blocks in any suitable order.

Figure 7:
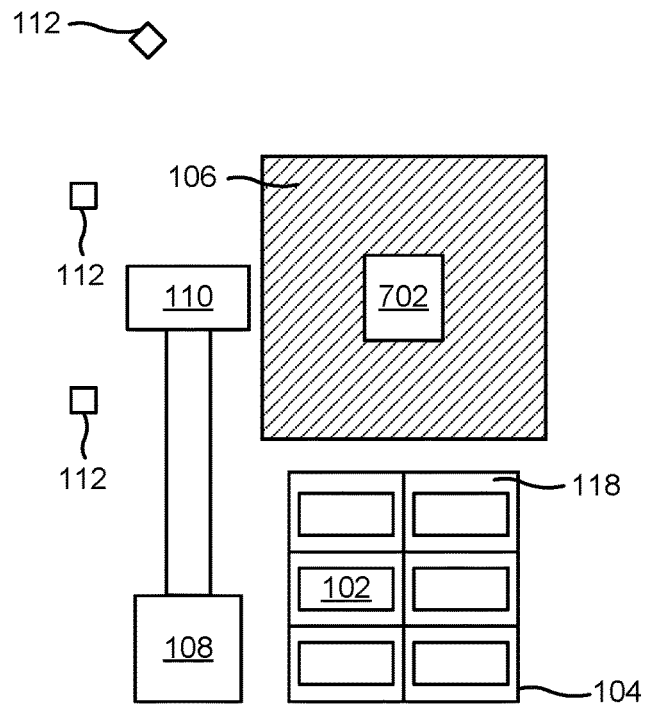

The process 600 at block 602 can include positioning an end-of-arm tool (e.g., end-of-arm tool 110) of a robotic manipulator (e.g., robotic manipulator 108) at a staging position (e.g., a perched position). FIGS. 7 and 11 illustrate the end-of-arm tool 110 positioned at the first position. The first position can be at or near an engagement area (e.g., engagement area 106). For example, the end-of-arm tool 110 can be positioned such that, when an inventory holder (e.g., inventory holder 104) is positioned in the engagement area 106, the end-of-arm tool 110 can be generally aligned with an inventory compartment (e.g., inventory compartment 118) of the inventory holder 104. The end-of-arm tool 110 being generally aligned with the inventory compartment 118 can allow the insertion of an inventory container (e.g., inventory container 102) into the inventory holder 104, for example, after the alignment has been further refined.

The end-of-arm tool 110 can be positioned at the first position before the inventory holder 104 has been positioned in the engagement area 106. However, the end-of-arm tool 110 can be positioned at the first position after the inventory holder 104 has been positioned in the engagement area 106 and/or simultaneously with the positioning the inventory holder 104 in the engagement area 106.

Figure 8:
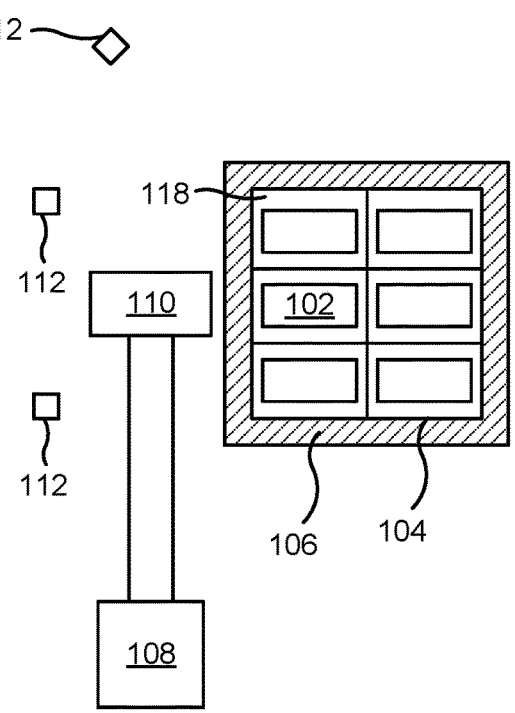

The process 600 at 604 can include positioning the inventory holder 104 adjacent to the end-of-arm tool 110. FIGS. 8 and 12 illustrate the inventory holder 104 positioned adjacent to the end-of-arm tool 110. The inventory holder 104 can be positioned in the engagement area 106. In various embodiments, the inventory holder 104 can be positioned on a fiducial mark (e.g., fiducial mark 702). The fiducial mark 702 can be positioned in the engagement area 106 such that, when the inventory holder 104 is positioned on the fiducial mark 702 an inventory compartment 118 on one side of the inventory holder 104 is generally aligned with the end-of-arm tool 110. The inventory holder 104 can include inventory containers 102. For example, some, all, or none of the inventory compartments 118 can include inventory containers 102.

Figure 9:
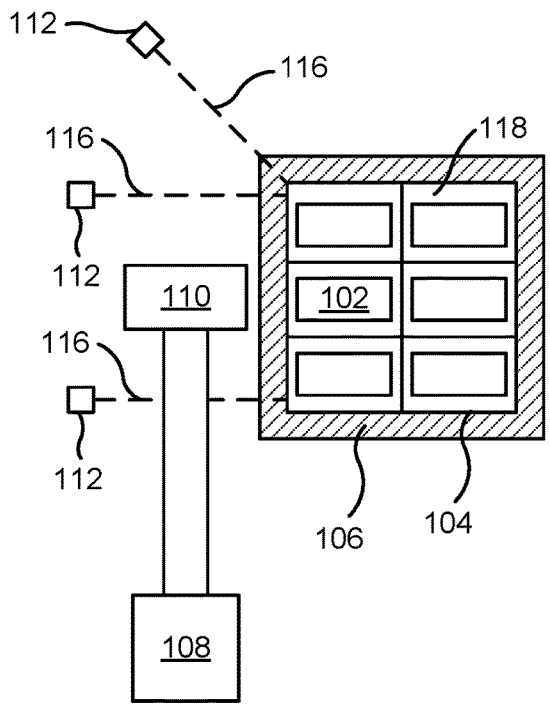

The process 600 at 606 can include determining distances (e.g., distances 116) to locations on the inventory holder 104 using sensors 112. FIGS. 9 and 13 illustrate the sensors 112 determining the distances 116. The distances 116 between the sensors 112 and various locations on the inventory holder 104 can be measured. For example, sensor 112a can measure distance 116a, sensor 112b can measure distance 116b, and/or sensor 112c can measure distance 116c. Determining the distances 116 can include using sensors 112 that can be or include4time-of-flight sensors and/or lidar sensors.

The process 600 at 608 can include determining a pitch, roll, and yaw of the inventory holder 104. The pitch, roll, and yaw can be determined using a computer system (e.g., computer device 120). The pitch, roll, and yaw can be determined by comparing the distances 116. For example, the pitch, roll, and yaw can be determined by comparing the differences in the distances 116.

The process 600 at 610 can include determining a position of an inventory compartment 118. The inventory compartment 118 can be a compartment that is generally aligned with the end-of-arm tool 110. The inventory compartment 118 can include an inventory container 102 or may be an empty inventory compartment 118. The position of the inventory compartment 118 can be determined using the pitch, roll, and yaw of the inventory holder 104. The inventory compartment 118 can have an expected position based on the position of the inventory holder 104 in the engagement area 106. The pitch, roll, and yaw can be used to determine the exact location of the inventory compartment 118 which may be different from the expected location of the inventory compartment 118. For example, if the pitch, roll, and/or yaw are non-zero the inventory compartment 118 can be positioned at a different location than the expected position. However, if the pitch, roll, and yaw are zero the inventory compartment 118 can be positioned at the expected position.

Figure 10:
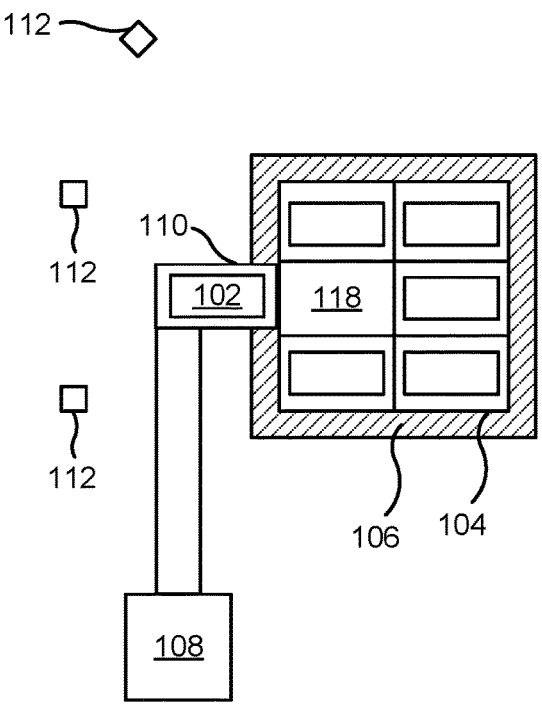

The process 600 at 612 can include positioning the end-of-arm tool 110 at a manipulation position. The end-of-arm tool 110 can be positioned by robotic manipulator 108. FIGS. 10 and 14 illustrate the end-of-arm tool 110 at the second location. At the second location, the end-of-arm tool 110 can be aligned with an inventory compartment 118. The end-of-arm tool 110 can engage with an inventory container 102, for example, to remove and/or deposit the inventory container 102 into and/or out of the inventory holder 104. For example, as shown in FIG. 10, the end-of-arm tool 110 can remove an inventory container 102 from the inventory holder 104 and, as shown in FIG. 14, the end-of-arm tool 110 can deposit an inventory container 102 into the inventory holder 104.

In various embodiments, after removing or depositing the inventory container 102, the robotic manipulator 108 can move the end-of-arm tool 110 to another location. For example, the end-of-arm tool 110 can be moved to another inventory compartment 118. The location of the second inventory compartment 118 can be determined using the same pitch, roll, and/or yaw that was used to determine the first inventory compartment 118. However, the location of the second inventory compartment 118 may be determined using different pitch, roll, and/or yaw values. At the second inventory compartment 118 the end-of-arm tool 110 can insert or extract an inventory container 102.

In further embodiments, after removing or depositing the inventory container 102, the robotic manipulator 108 can move the end-of-arm tool 110 to a staging position (e.g., a position that is generally aligned with an inventory compartment 118). The end-of-arm tool 110 can be at a position for general alignment with an inventory compartment 118 on the same inventory holder 104 or a different inventory holder. For example, the end-of-arm tool 110 can be aligned with an inventory compartment 118 on a different side of the inventory holder 104.

Figure 15:
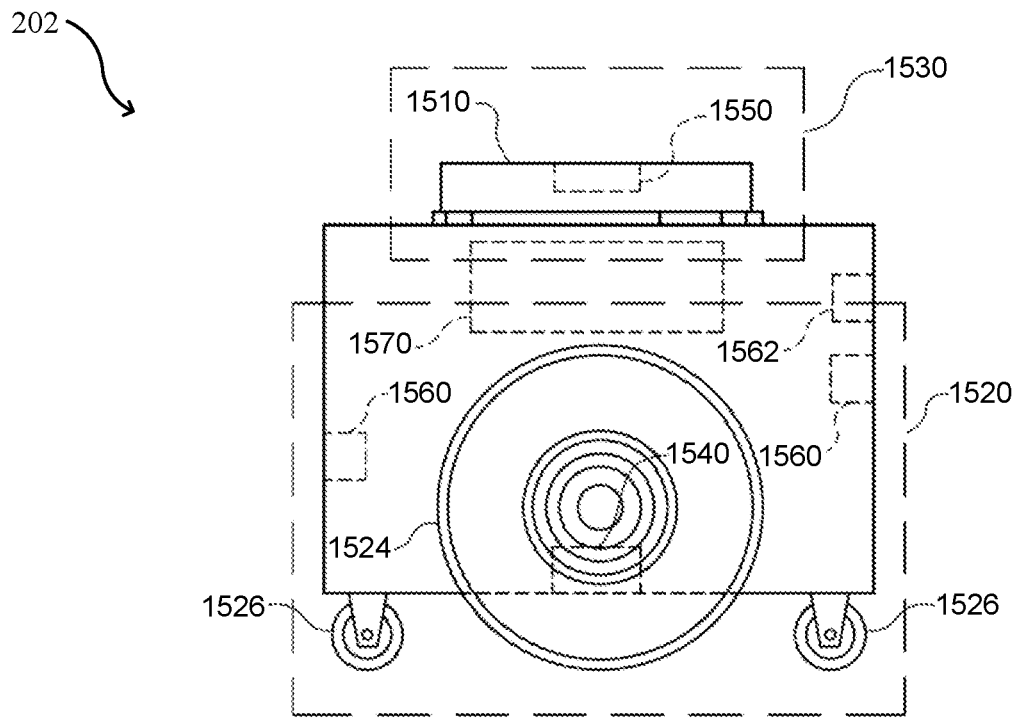
FIGS. 15 and 16 illustrate an example mobile drive unit that may be utilized in particular embodiments of the inventory management system of FIG. 1.
Figure 16:
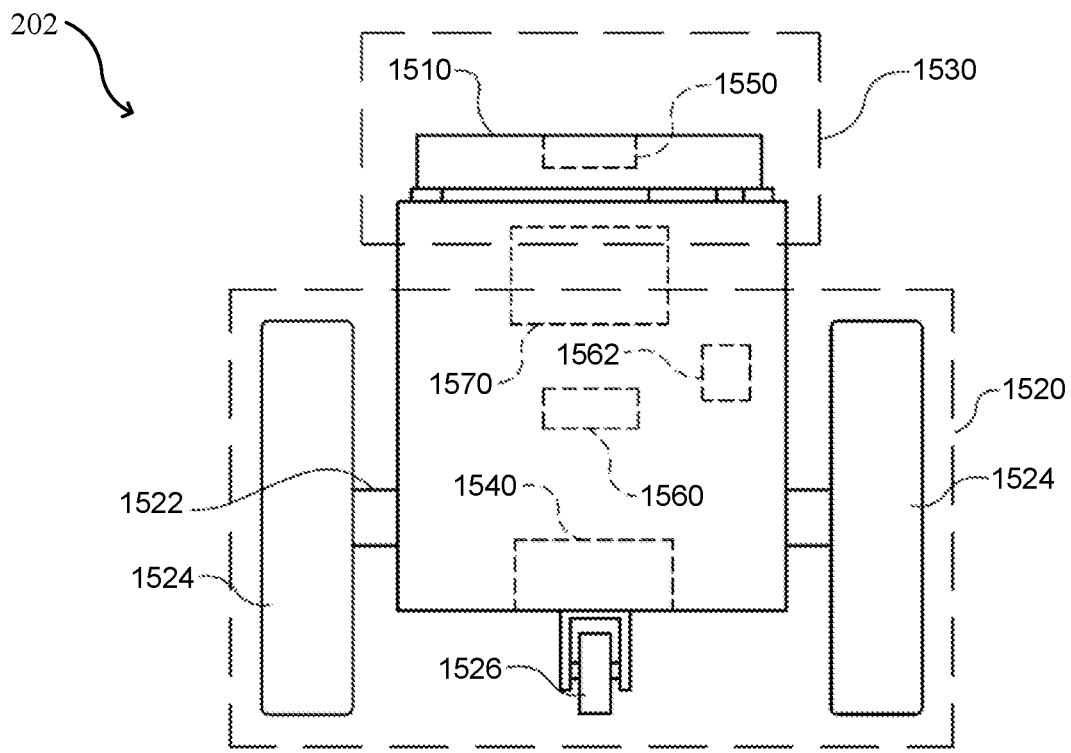

Turning to FIGS. 15 and 16, the components of a particular embodiment of the mobile drive unit 202 is illustrated. In particular, FIGS. 15 and 16 include a front and side view of an example mobile drive unit 202. Mobile drive unit 202 includes a docking head 1510, a drive module 1520, a docking actuator 1530, and a control module 1570. Additionally, mobile drive unit 202 may include one or more sensors configured to detect or determine the location of mobile drive unit 202, inventory holder 104, and/or other appropriate elements of inventory management system 100. In the illustrated embodiment, mobile drive unit 202 includes a position sensor 1540, a holder sensor 1550, an obstacle sensor 1560, and an identification signal transmitter 1562.

Docking head 1510, in particular embodiments of mobile drive unit 202, couples mobile drive unit 202 to the inventory holder 104 and/or supports inventory holder 104 when mobile drive unit 202 is docked to the inventory holder 104. Docking head 1510 may additionally allow mobile drive unit 202 to maneuver the inventory holder 104, such as by lifting the inventory holder 104, propelling the inventory holder 104, rotating the inventory holder 104, and/or moving the inventory holder 104 in any other appropriate manner. Docking head 1510 may also include any appropriate combination of components, such as ribs, spikes, and/or corrugations, to facilitate such manipulation of the inventory holder 104. For example, in particular embodiments, docking head 1510 may include a high-friction portion that abuts a portion of the inventory holder 104 while mobile drive unit 202 is docked to the inventory holder 104. In such embodiments, frictional forces created between the high-friction portion of docking head 1510 and a surface of the inventory holder 104 may induce translational and rotational movement in the inventory holder 104 when docking head 1510 moves and rotates, respectively. As a result, mobile drive unit 202 may be able to manipulate the inventory holder 104 by moving or rotating docking head 1510, either independently or as a part of the movement of mobile drive unit 202 as a whole.

Drive module 1520 propels mobile drive unit 202 and, when mobile drive unit 202 and the inventory holder 104 are docked, the inventory holder 104. Drive module 1520 may represent any appropriate collection of components operable to propel mobile drive unit 202. For example, in the illustrated embodiment, drive module 1520 includes motorized axle 1522, a pair of motorized wheels 1524, and a pair of stabilizing wheels 1526. One motorized wheel 1524 is located at each end of motorized axle 1522, and one stabilizing wheel 1526 is positioned at each end of mobile drive unit 202.

Docking actuator 1530 moves docking head 1510 towards the inventory holder 104 to facilitate docking of mobile drive unit 202 and the inventory holder 104. Docking actuator 1530 may also be capable of adjusting the position or orientation of docking head 1510 in other suitable manners to facilitate docking. Docking actuator 1530 may include any appropriate components, based on the configuration of mobile drive unit 202 and the inventory holder 104, for moving docking head 1510 or otherwise adjusting the position or orientation of docking head 1510. For example, in the illustrated embodiment, docking actuator 1530 includes a motorized shaft (not shown) attached to the center of docking head 1510. The motorized shaft is operable to lift docking head 1510 as appropriate for docking with the inventory holder 104.

Drive module 1520 may be configured to propel mobile drive unit 202 in any appropriate manner. For example, in the illustrated embodiment, motorized wheels 1524 are operable to rotate in a first direction to propel mobile drive unit 202 in a forward direction. Motorized wheels 1524 are also operable to rotate in a second direction to propel mobile drive unit 202 in a backward direction. In the illustrated embodiment, drive module 1520 is also configured to rotate mobile drive unit 202 by rotating motorized wheels 1524 in different directions from one another or by rotating motorized wheels 1524 at different speeds from one another.

Position sensor 1540 represents one or more sensors, detectors, or other components suitable for determining the location of mobile drive unit 202 in any appropriate manner. For example, in particular embodiments, the engagement area 106 and/or the warehouse environment associated with inventory management system 100 includes a number of fiducial marks 702 that mark points on a two-dimensional grid. In such embodiments, position sensor 1540 may include a camera and suitable image- and/or video-processing components, such as an appropriately-programmed digital signal processor, to allow position sensor 1540 to detect fiducial marks 702 within the camera's field of view. Control module 1570 may store location information that position sensor 1540 updates as position sensor 1540 detects fiducial marks 702. As a result, position sensor 1540 may utilize fiducial marks 702 to maintain an accurate indication of the location mobile drive unit 202 and to aid in navigation when moving within engagement area 106 and/or the warehouse environment.

Holder sensor 1550 represents one or more sensors, detectors, or other components suitable for detecting inventory holder 30 and/or determining, in any appropriate manner, the location of the inventory holder 104, as an absolute location or as a position relative to mobile drive unit 202. Holder sensor 1550 may be capable of detecting the location of a particular portion of the inventory holder 104 or the inventory holder 104 as a whole. Mobile drive unit 202 may then use the detected information for docking with or otherwise interacting with the inventory holder 104.

Obstacle sensor 1560 represents one or more sensors capable of detecting objects located in one or more different directions in which mobile drive unit 202 is capable of moving. Obstacle sensor 1560 may utilize any appropriate components and techniques, including optical, radar, sonar, pressure-sensing and/or other types of detection devices appropriate to detect objects located in the direction of travel of mobile drive unit 202. In particular embodiments, obstacle sensor 1560 may transmit information describing objects it detects to control module 1570 to be used by control module 1570 to identify obstacles and to take appropriate remedial actions to prevent mobile drive unit 202 from colliding with obstacles and/or other objects.

Obstacle sensor 1560 may also detect signals transmitted by other mobile drive units 202 operating in the vicinity of the illustrated mobile drive unit 202. For example, in particular embodiments of inventory management system 100, one or more mobile drive units 202 may include an identification signal transmitter 1562 that transmits a drive identification signal. The drive identification signal indicates to other mobile drive units 202 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 202.

Additionally, in particular embodiments, obstacle sensor 160 may also be capable of detecting state information transmitted by other mobile drive units 202. For example, in particular embodiments, identification signal transmitter 1562 may be capable of including state information relating to mobile drive unit 202 in the transmitted identification signal. This state information may include, but is not limited to, the position, velocity, direction, and the braking capabilities of the transmitting mobile drive unit 202. In particular embodiments, mobile drive unit 202 may use the state information transmitted by other mobile drive units to avoid collisions when operating in close proximity with those other mobile drive units.

Control module 1570 monitors and/or controls operation of drive module 1520 and docking actuator 1530. Control module 1570 may also receive information from sensors such as position sensor 1540 and holder sensor 1550 and adjust the operation of drive module 1520, docking actuator 1530, and/or other components of mobile drive unit 202 based on this information. Additionally, in particular embodiments, mobile drive unit 202 may be configured to communicate with a management device of inventory management system 100 and control module 1570 may receive commands transmitted to mobile drive unit 202 and communicate information back to the management device utilizing appropriate communication components of mobile drive unit 202. Control module 1570 may include any appropriate hardware and/or software suitable to provide the described functionality. In particular embodiments, control module 1570 includes a general-purpose microprocessor programmed to provide the described functionality. Additionally, control module 1570 may include all or portions of docking actuator 1530, drive module 1520, position sensor 1540, and/or holder sensor 1550, and/or share components with any of these elements of mobile drive unit 202.

Moreover, in particular embodiments, control module 1570 may include hardware and software located in components that are physically distinct from the device that houses drive module 1520, docking actuator 1530, and/or the other components of mobile drive unit 202 described above. For example, in particular embodiments, each mobile drive unit 202 operating in inventory management system 100 may be associated with a software process (referred to here as a "drive agent") operating on a server that is in communication with the device that houses drive module 1520, docking actuator 1530, and other appropriate components of mobile drive unit 202. This drive agent may be responsible for requesting and receiving tasks, requesting and receiving routes, transmitting state information associated with mobile drive unit 202, and/or otherwise interacting with computer system 120 and other components of inventory management system 100 on behalf of the device that physically houses drive module 1520, docking actuator 1530, and the other appropriate components of mobile drive unit 202. As a result, for the purposes of this description and the claims that follow, the term "mobile drive unit" includes software and/or hardware, such as agent processes, that provides the described functionality on behalf of mobile drive unit 202 but that may be located in physically distinct devices from the drive module 1520, docking actuator 1530, and/or the other components of mobile drive unit 202 described above.

While FIGS. 15 and 16 illustrate a particular embodiment of mobile drive unit 202 containing certain components and configured to operate in a particular manner, mobile drive unit 202 may represent any appropriate component and/or collection of components configured to transport and/or facilitate the transport of inventory holders 104. As another example, mobile drive unit 202 may represent part of an overhead crane system in which one or more crane assemblies are capable of moving within a network of wires or rails to a position suitable to dock with a particular inventory holder 104. After docking with the inventory holder 104, the crane assembly may then lift inventory the inventory holder 104 and move inventory to another location for purposes of completing an assigned task.

Furthermore, in particular embodiments, mobile drive unit 202 may represent all or a portion of the inventory holder 104. The inventory holder 104 may include motorized wheels or any other components suitable to allow the inventory holder 104 to propel itself. As one specific example, a portion of the inventory holder 104 may be responsive to magnetic fields. Inventory management system 100 may be able to generate one or more controlled magnetic fields capable of propelling, maneuvering and/or otherwise controlling the position of the inventory holder 104 as a result of the responsive portion the inventory holder 104. In such embodiments, mobile drive unit 202 may represent the responsive portion of the inventory holder 104 and/or the components of inventory management system 100 responsible for generating and controlling these magnetic fields.

Figure 17:
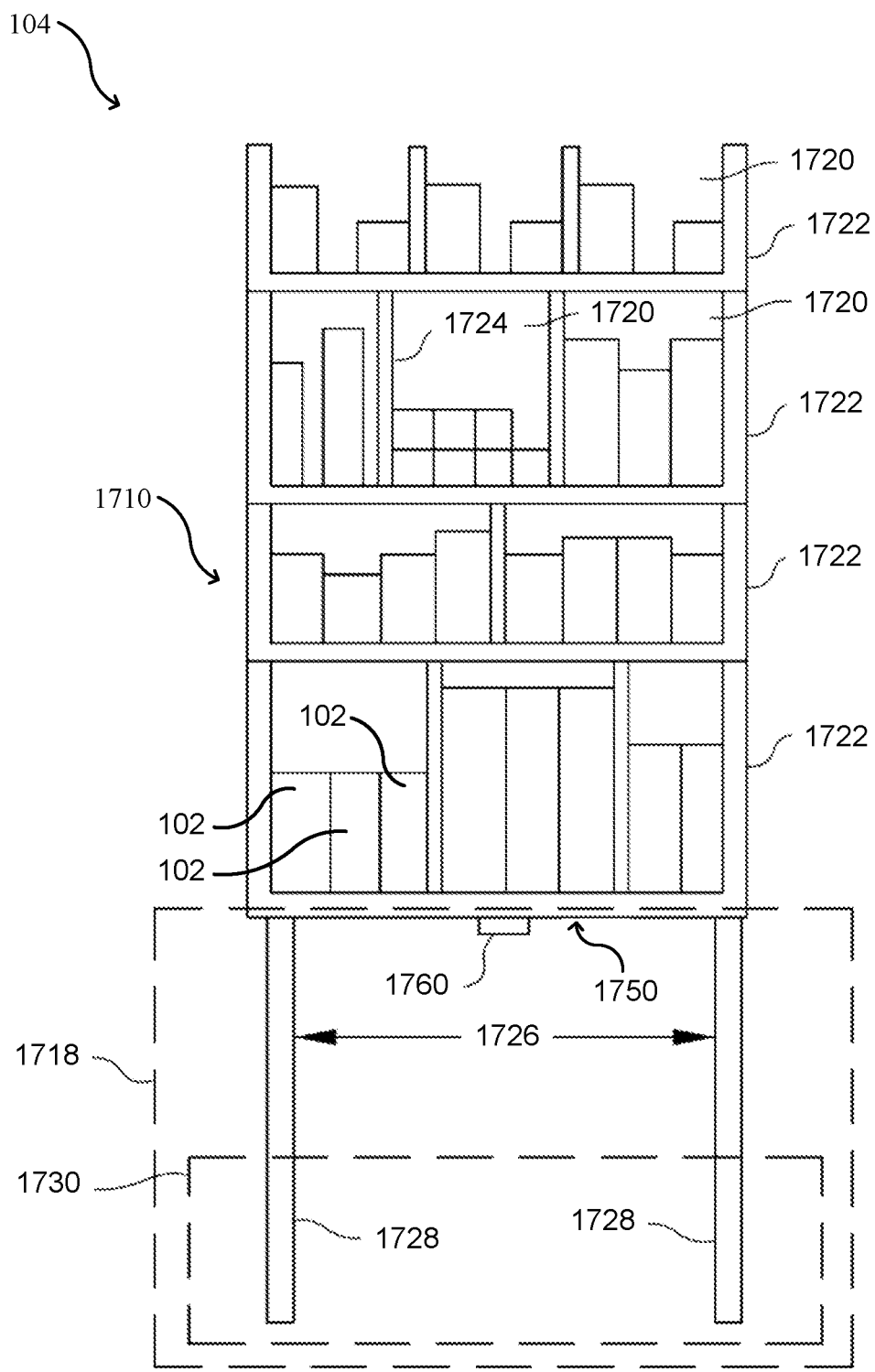
FIG. 17 illustrates an example inventory holder that may be utilized in particular embodiments of the inventory management system of FIG. 1.

FIG. 17 illustrates in greater detail the components of a particular embodiment of inventory holder 104. In particular, FIG. 17 illustrates the structure and contents of one side of an example inventory holder 104. In a particular embodiment, inventory holder 104 may comprise any number of faces with similar or different structure. As illustrated, inventory holder 104 includes a frame 1710, a plurality of legs 1728, and a docking surface 1750.

Frame 1710 holds inventory containers 102. Frame 1710 provides storage space for storing inventory containers 102 external or internal to frame 1710. The storage space provided by frame 1710 may be divided into a plurality of inventory compartments 118, each capable of holding inventory containers 102. Inventory compartments 118 may include any appropriate storage elements, such as bins, compartments, or hooks.

In a particular embodiment, frame 1710 is composed of a plurality of trays 1722 stacked upon one another and attached to or stacked on a base 1718. In such an embodiment, inventory compartments 118 may be formed by a plurality of adjustable dividers 1724 that may be moved to resize one or more inventory compartments 118. In alternative embodiments, frame 1710 may represent a single inventory compartment 1720 that includes a single tray 1722 and no adjustable dividers 1724. Additionally, in particular embodiments, frame 1710 may represent a load-bearing surface mounted on mobility element 17104. Inventory containers 102 may be stored on such an inventory holder 104 by being placed on frame 1710. In general, frame 1710 may include storage internal and/or external storage space divided into any appropriate number of inventory compartments 118 in any appropriate manner.

Additionally, in a particular embodiment, frame 1710 may include a plurality of device openings 1726 that allow mobile drive unit 202 to position docking head 1510 adjacent docking surface 1750. The size, shape, and placement of device openings 1726 may be determined based on the size, the shape, and other characteristics of the particular embodiment of mobile drive unit 202 and/or inventory holder 104 utilized by the inventory management system 100. For example, in the illustrated embodiment, frame 1710 includes four legs 1728 that form device openings 1726 and allow mobile drive unit 202 to position mobile drive unit 202 under frame 1710 and adjacent to docking surface 1750. The length of legs 1728 may be determined based on a height of mobile drive unit 202.

Docking surface 1750 comprises a portion of inventory holder 104 that couples to, abuts, and/or rests upon a portion of docking head 1510, when mobile drive unit 202 is docked to inventory holder 104. Additionally, docking surface 1750 supports a portion or all of the weight of inventory holder 104 while inventory holder 104 is docked with mobile drive unit 202. The composition, shape, and/or texture of docking surface 1750 may be designed to facilitate maneuvering of inventory holder 104 by mobile drive unit 202. For example, as noted above, in particular embodiments, docking surface 1750 may comprise a high-friction portion. When mobile drive unit 202 and inventory holder 104 are docked, frictional forces induced between docking head 1510 and this high-friction portion may allow mobile drive unit 202 to maneuver inventory holder 104. Additionally, in particular embodiments, docking surface 1750 may include appropriate components suitable to receive a portion of docking head 1510, couple inventory holder 104 to mobile drive unit 202, and/or facilitate control of inventory holder 104 by mobile drive unit 202.

Holder identifier 1760 marks a predetermined portion of inventory holder 104 and mobile drive unit 202 may use holder identifier 1760 to align with inventory holder 104 during docking and/or to determine the location of inventory holder 104. More specifically, in particular embodiments, mobile drive unit 202 may be equipped with components, such as holder sensor 1550, that can detect holder identifier 1760 and determine its location relative to mobile drive unit 202. As a result, mobile drive unit 202 may be able to determine the location of inventory holder 104 as a whole. For example, in particular embodiments, holder identifier 1760 may represent a reflective marker that is positioned at a predetermined location on inventory holder 104 and that holder sensor 1550 can optically detect using an appropriately-configured camera.

Depending on the configuration and characteristics of mobile drive unit 202 and inventory management system 100, mobile drive unit 202 may move inventory holder 104 using a variety of appropriate methods. In a particular embodiment, mobile drive unit 202 is capable of moving inventory holder 104 along a two-dimensional grid, combining movement along straight-line segments with ninety-degree rotations and arcing paths to transport inventory holder 104 from the first location to the second location. Additionally, while moving, mobile drive unit 202 may use fixed objects located in the workspace as reference points to assist in navigation. For example, in particular embodiments, inventory management system 100 includes multiple fiducial marks. Mobile drive unit 202 may be configured to detect fiducial marks and to determine the location of mobile drive unit 202 and/or measure its movement based on the detection of fiducial marks.

After mobile drive unit 202 arrives at the second location, mobile drive unit 202 may perform appropriate operations to facilitate access to inventory containers 102 stored in inventory holder 104. For example, mobile drive unit 202 may rotate inventory holder 104 to present a particular face of inventory holder 104 to an operator of the inventory management system 100 or other suitable party, such as a packer selecting inventory containers 102 from inventory holder 104. Mobile drive unit 202 may also undock from inventory holder 104. Alternatively, instead of undocking at the second location, mobile drive unit 202 may transport inventory holder 104 back to the first location or to a third location after any appropriate actions have been taken involving inventory containers 102. For example, after a packer has removed particular inventory containers 102 from inventory holder 104, mobile drive unit 202 may return inventory holder 104 to its original storage location, a new storage location, or another inventory station. Mobile drive unit 202 may then undock from inventory holder 104 at this new location.

Figure 18:
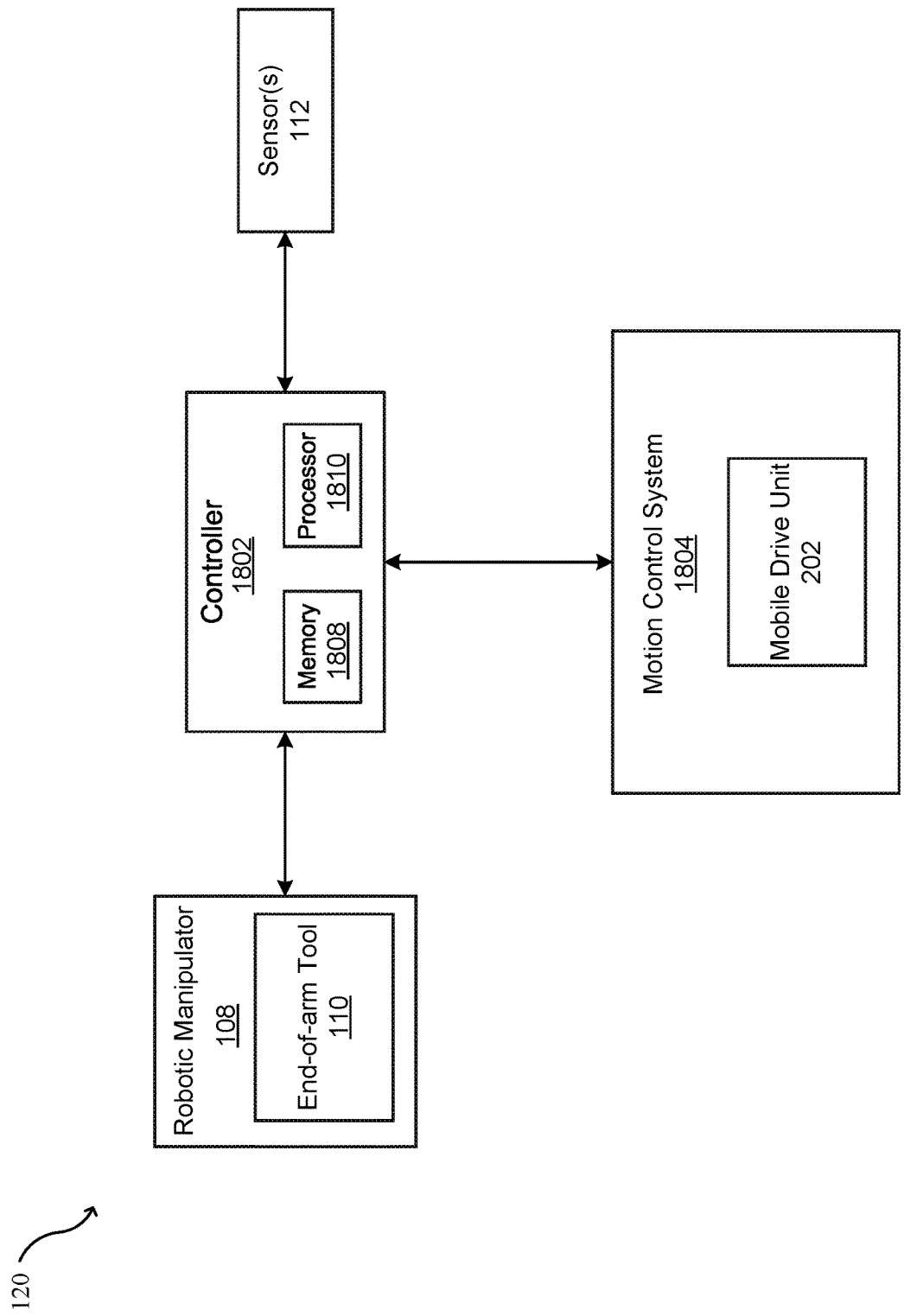
FIG. 18 is a simplified schematic diagram illustrating examples of control aspects that may be utilized in certain embodiments of the inventory management system of FIG. 1.

Turning to FIG. 18, a simplified schematic diagram 1800 illustrating examples of control aspects that may be utilized in certain embodiments of the inventory management system 100 of FIG. 1 is shown. A controller 1802 can communicate information and/or instructions associated with the inventory management system 100. The controller 1802 can be in communication with the robotic manipulator 108, the end-of-arm tool 110, a motion control system 1804, the mobile drive unit 202, the sensors 112, and/or respective components associated with such elements, such as graphically included within each element in FIG. 18. The controller 1802 can communicate via a wired or wireless connection (e.g., Bluetooth). The controller 1802 can include memory 1808 and a processor 1810. The memory 1808 and the processor 1810 can be included in a single structure. However, the memory 1808 and processor 1810 may be part of a system of multiple interconnected devices.

The memory 1808 can include any type of memory device that retains stored information when powered off. The memory 1808 can be or include electrically erasable and programmable read-only memory ("EEPROM"), flash memory, or any other type of non-volatile memory. In some examples, at least part of the memory 1808 can include a medium from which the processor 1810 can read instructions. A non-transitory computer-readable medium can include electronic, optical, magnetic, or other storage devices capable of providing the processor 1810 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The processor 1810 can execute instructions stored in the memory 1808 to perform operations, for example, determining an item status based on item data. The processor 1810 can include one processing device or multiple processing devices. Non-limiting examples of the processor 1810 include a Field-Programmable Gate Array ("FPGA"), an application-specific integrated circuit ("ASIC"), a microprocessor, etc.

The motion control system 1804 can include components for communicating with the mobile drive unit 202, the sensors 112, and/or any other components that may impart or control motion of inventory containers 102 within the warehouse environment. The motion control system 1804 can include discreet components located at different locations. For example, a portion of the motion control system 1804 may be positioned on the mobile drive unit 202.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments are described herein, including the many modes known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system, comprising:
a robotic manipulator comprising an end-of-arm tool configured to engage with a container;
an inventory holder including a first side defining a compartment configured to receive the container;
a drive unit engageable with the inventory holder and comprising a propulsion system selectively operable to engage with and position the inventory holder;
sensors configured to detect a portion of the inventory holder; and
a computing device configured to:
  instruct the robotic manipulator to position the end-of-arm tool at a staging position;
  instruct the drive unit to position the inventory holder adjacent to the end-of-arm tool with the first side oriented toward the end-of-arm tool;
  determine, using the sensors, distances from the sensors to locations on the inventory holder;
  generate, using the distances, a pitch, a roll, and a yaw of the inventory holder;
  generate, using the pitch, the roll, and the yaw, a location of the compartment on the first side of the inventory holder; and
  instruct, using the location of the compartment, the robotic manipulator to position the end-of-arm tool at a manipulation position, wherein in the manipulation position the end-of-arm tool is positioned to move the container relative to the compartment.

2. The inventory management system of claim 1, wherein the sensors comprise first, second, and third sensors configured to measure the distances to the locations on the inventory holder.

3. The inventory management system of claim 2, wherein the first, second, or third sensor comprises a time-of-flight sensor.

4. The inventory management system of claim 2, wherein the first sensor is positioned to detect an edge of the first side of the inventory holder and the second and third sensors are configured to detect the first side of the inventory holder.

5. The inventory management system of claim 4, further comprising fourth and fifth sensors configured to measure a distance to a location on the inventory holder, wherein the fourth sensor is vertically aligned with and positioned below the first sensor, the fifth sensor is vertically aligned with and positioned below the second sensor, and the third, fourth, and fifth sensors are horizontally aligned.

6. The inventory management system of claim 5, wherein the computing device determines the pitch based on distances measured by the first and fourth sensors, the roll based on distances measured by the second and fifth sensors, and the yaw based on distances measured by the third and fifth sensors.

7. An inventory management system comprising:
sensors; and
a computing device configured to:
  instruct a drive unit to position an inventory holder in an engagement area;
  determine, using the sensors, distances to locations on the inventory holder;
  determine, using the distances, a pitch, a roll, and a yaw of the inventory holder;
  determine, using the pitch, the roll, and the yaw, a position of a compartment on a first side of the inventory holder; and instruct, using the position of the compartment, a robotic manipulator to position an end-of-arm tool at a manipulation position.

8. The inventory management system of claim 7, wherein, prior to instructing the drive unit to position the inventory holder in the engagement area, the computing device is configured to instruct the robotic manipulator to position the end-of-arm tool at a staging position.

9. The inventory management system of claim 7, wherein instructing the drive unit to position the inventory holder in the engagement area comprises instructing the drive unit to position the inventory holder at an engagement position based on data detected by a camera, and wherein in the engagement position, the inventory holder is adjacent to the end-of-arm tool with the first side of the inventory holder oriented toward the end-of-arm tool.

10. The inventory management system of claim 7, wherein in the manipulation position the end-of-arm tool is aligned with the compartment and positioned to engage with a container and move the container relative to the compartment.

11. The inventory management system of claim 7, wherein the sensors comprise a time-of-flight sensor, lidar, interferometers, or proximity sensors.

12. The inventory management system of claim 7, wherein the computing device is further configured to, after instructing the robotic manipulator to position the end-of-arm tool at the manipulation position, instruct the end-of-arm tool to engage with a container and move the container relative to the compartment.

13. The inventory management system of claim 12, wherein the computing device is further configured to, after instructing the end-of-arm tool to engage with the container and move the container relative to the compartment, instruct the robotic manipulator to position the end-of-arm tool at a second staging position or a second manipulation position.

14. The inventory management system of claim 13, wherein at the second manipulation position, the end-of-arm tool is aligned at a second compartment of the inventory holder.

15. A method of managing containers comprising:
 determining, using sensors, distances to locations on an inventory holder;
 determining, using the distances, a pitch, a roll, and a yaw of the inventory holder;
 determining, using the pitch, the roll, and the yaw, a position of a compartment on a first side of the inventory holder; and
 positioning an end-of-arm tool at a manipulation position aligned with the compartment.

16. The method of claim 15, wherein prior to determining distances to locations on the inventory holder, the method comprises positioning the end-of-arm tool at a staging position.

17. The method of claim 15, wherein prior to determining distances to locations on the inventory holder, the method comprises positioning the inventory holder in an engagement area.

18. The method of claim 17, wherein positioning the inventory holder in the engagement area comprises positing the inventory holder adjacent to an end-of-arm tool with a first side of the inventory holder oriented toward the end-of-arm tool.

19. The method of claim 15, further comprising engaging the end-of-arm tool with an inventory container and moving the inventory container relative to the compartment.

20. The method of claim 15, further comprising:
 positioning, using the manipulation position, the end-of-arm tool at a second manipulation position aligned with a second compartment.

* * * * *